May 28, 1929.

N. D. LEVIN

COAL MINING APPARATUS

Original Filed Jan. 5, 1917 7 Sheets-Sheet 1

Re. 17,305

WITNESSES:
Harry C. Dean
Dudley T. Fisher

INVENTOR.
Niles D. Levin
BY
H. S. Bliss
ATTORNEY.

May 28, 1929.

N. D. LEVIN

COAL MINING APPARATUS

Re. 17,305

Original Filed Jan. 5, 1917 7 Sheets-Sheet 2

WITNESSES:
Harry C. Dean.
Dudley T. Fisher

INVENTOR.
BY Nils D. Levin
ATTORNEY.

May 28, 1929. N. D. LEVIN Re. 17,305

COAL MINING APPARATUS

Original Filed Jan. 5, 1917 7 Sheets-Sheet 3

INVENTOR

Nile D. Levin

BY

H. S. Blair

ATTORNEY

WITNESSES:

Harry C. Dean

Dudley T. Fisher

May 28, 1929. N. D. LEVIN Re. 17,305

COAL MINING APPARATUS

Original Filed Jan. 5, 1917 7 Sheets-Sheet 4

WITNESSES:
Harry C. Dean.
Dudley T. Fisher.

INVENTOR.
Nils D. Levin
By Orton & Bend
ATTORNEY.

May 28, 1929. N. D. LEVIN Re. 17,305

COAL MINING APPARATUS

Original Filed Jan. 5, 1917 7 Sheets-Sheet 5

WITNESSES:
Harry E. Dean
Dudley T. Fisher

INVENTOR.
Nils D. Levin
BY
H. A. Blair
ATTORNEY.

May 28, 1929. N. D. LEVIN Re. 17,305
COAL MINING APPARATUS
Original Filed Jan. 5, 1917 7 Sheets-Sheet 6
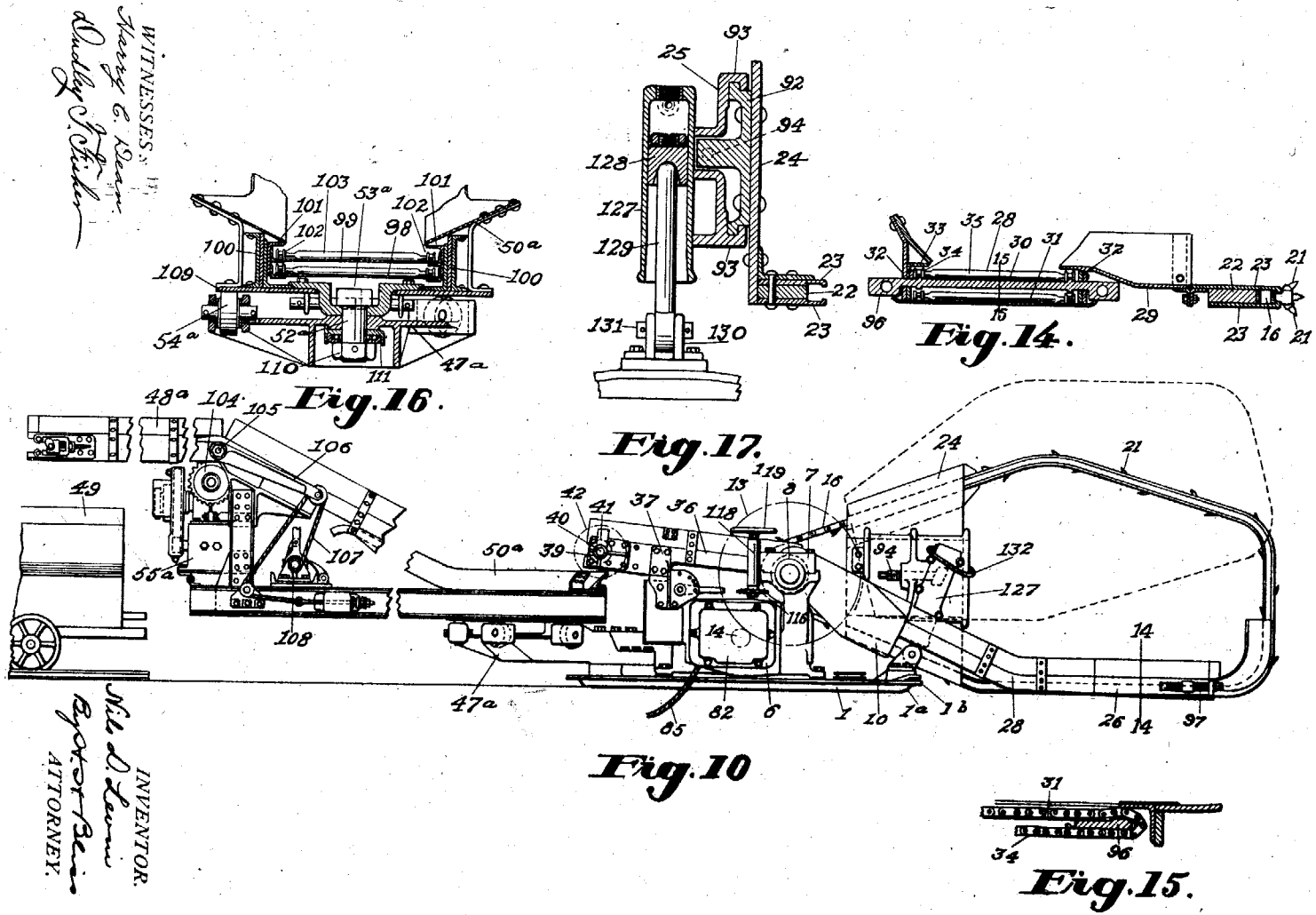

May 28, 1929.
N. D. LEVIN
COAL MINING APPARATUS
Re. 17,305
Original Filed Jan. 5, 1917 7 Sheets-Sheet 7
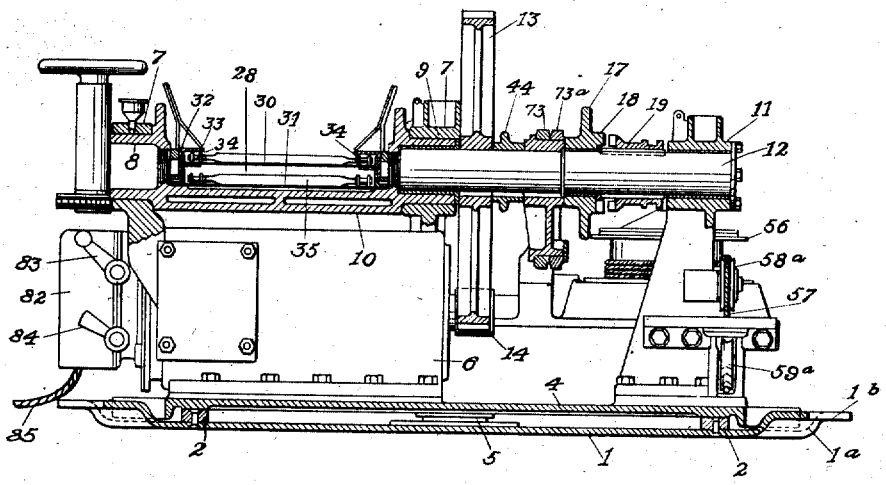
Fig. 11.
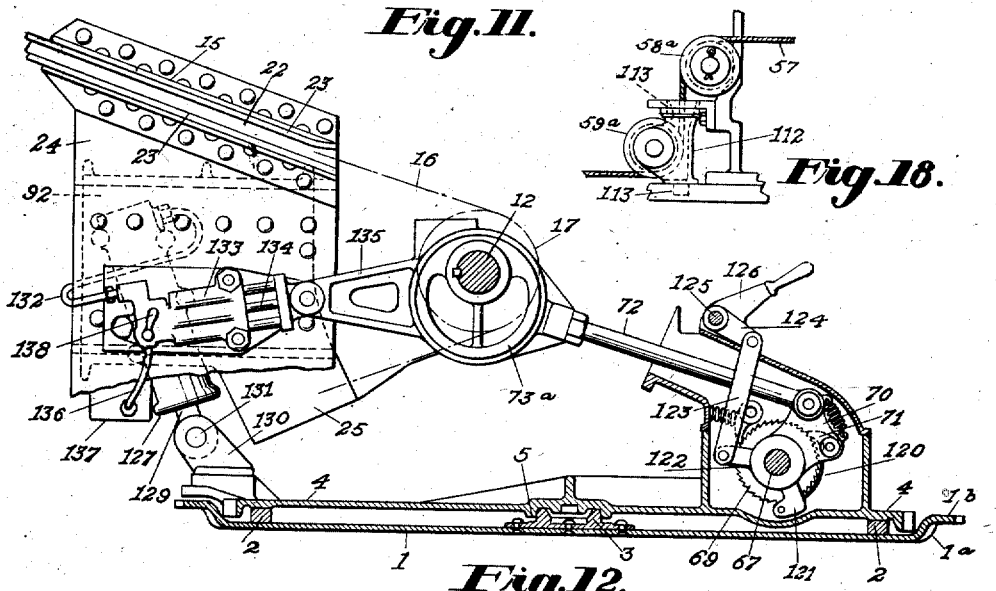
Fig. 12.
Fig. 18.
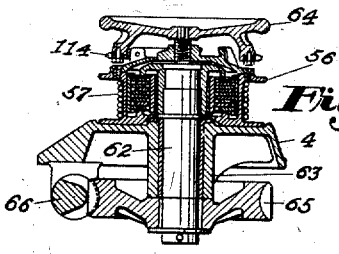
Fig. 13.
WITNESSES:
Harry C. Dean
Dudley T. Fisher
INVENTOR.
BY Nils D. Levin
H. A. Bein
ATTORNEY.

Reissued May 28, 1929. Re. 17,305

UNITED STATES PATENT OFFICE.

NILS D. LEVIN, OF COLUMBUS, OHIO, ASSIGNOR TO JEFFREY MANUFACTURING COMPANY, OF COLUMBUS, OHIO, A CORPORATION OF OHIO.

COAL-MINING APPARATUS.

Original application filed January 5, 1917, Serial No. 140,749. Renewed August 29, 1924. Original No. 1,638,447, dated August 9, 1927. Application for reissue filed October 22, 1927. Serial No. 228,088.

This invention relates to certain new and useful improvements in coal mining apparatus and particularly to that class of apparatus whereby sections are completely severed from the mass of the coal vein and deposited in conveniently disposed receptacles for transport from the mines.

The especial object of this invention is to provide a machine of the class described which shall be simple, durable and reliable of construction and effective and efficient in operation.

The devices by which I attained this object are fully set forth in the following specification and illustrated in the accompanying drawings of which Figure 1 is a plan view of the preferred embodiment of my invention.

Figures 5, 6, 7, and 8 are diagrammatic plan views showing methods of operating the machine.

Figures 9, 19, 20:
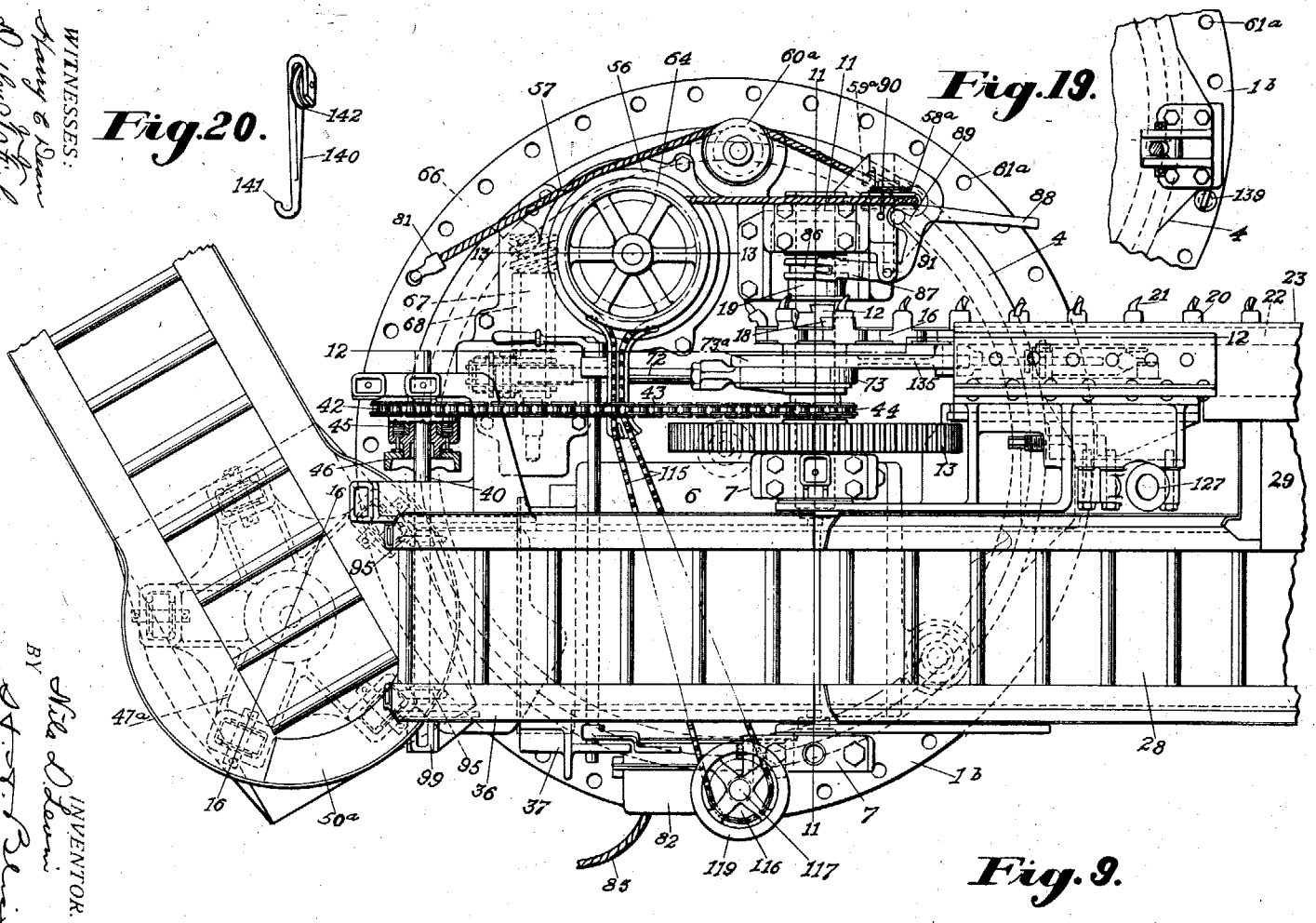

Figure 9 is a plan view of a modification of the machine.

Figure 10 is a side elevation of the machine illustrated in Figure 9.

Figure 11 is a vertical cross section taken on the line 11—11 of Figure 9.

Figure 12 is a fragmentary vertical longitudinal section along the line 12—12 of Figure 9.

Figure 13 is a section along the line 13—13 of Figure 9.

Figure 14 is a transverse section along the line 14—14 of Figure 10.

Figure 15 is a fragmentary longitudinal section along the line 15—15 of Figure 14.

Figure 16 is a transverse vertical section along the line 16—16 of Figure 9.

Figure 17 is a detail of the hydraulic lifting mechanism connected with the cutting devices.

Figure 18 is a detail of the pivotal mounting of the guide sheaves over which the feed rope is lead from the winding drum.

Figure 19 is a fragmentary plan view showing the method of locking the main frame of the machine to prevent rotation relative to the supporting base.

Figure 20 is a detail of a detachable guide sheave.

Figure 21:
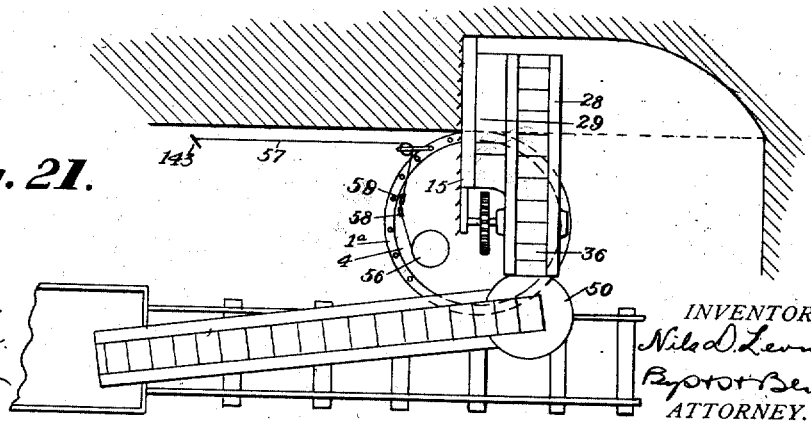

Figure 21 is a diagrammatic plan view showing the method of operating the machine on the long wall system of mining.

Like numerals refer to similar parts in the several figures.

Speaking broadly this machine comprises a sole plate adapted to rest upon and slide over the floor of the mine, upon which is mounted a turn table constituting the base frame upon which the operative parts of the machine are mounted. These operative parts consist of a laterally projecting loop shaped cutter frame disposed in a vertical plane, and adapted, when the turn table is rotated, to form a kerf in the mine wall extending above, behind, and below a section of coal to completely sever it from the mass of the vein, and a system of conveyers adapted to receive such severed sections of coal and transport them to the rear of the machine to be deposited in conveniently placed cars for transport from the mine. Upon this turn table is also mounted feeding devices by which the turn table may be rotated in either direction and by which the entire machine may be moved relative to the coal face.

Figure 1:
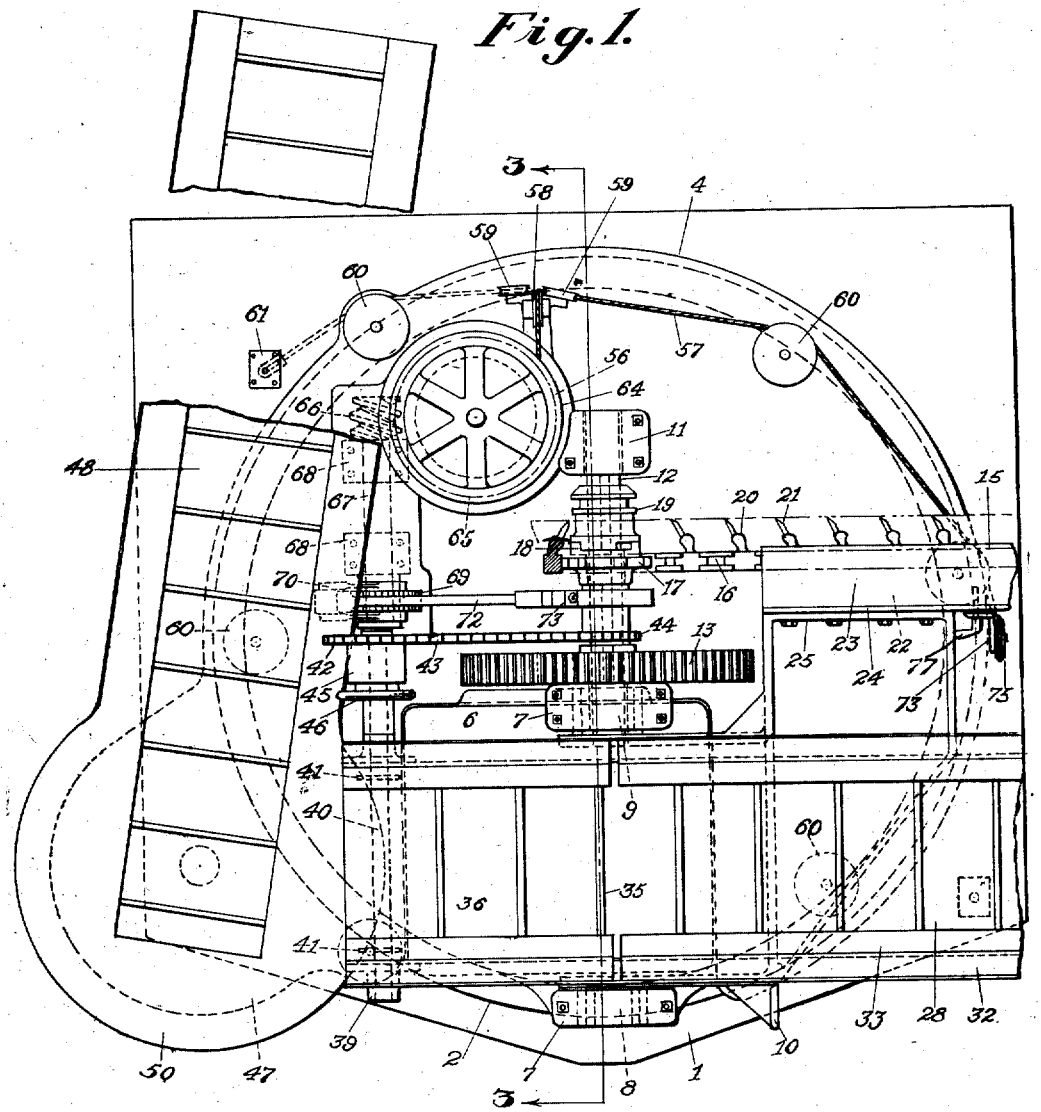
Figures 2, 4:
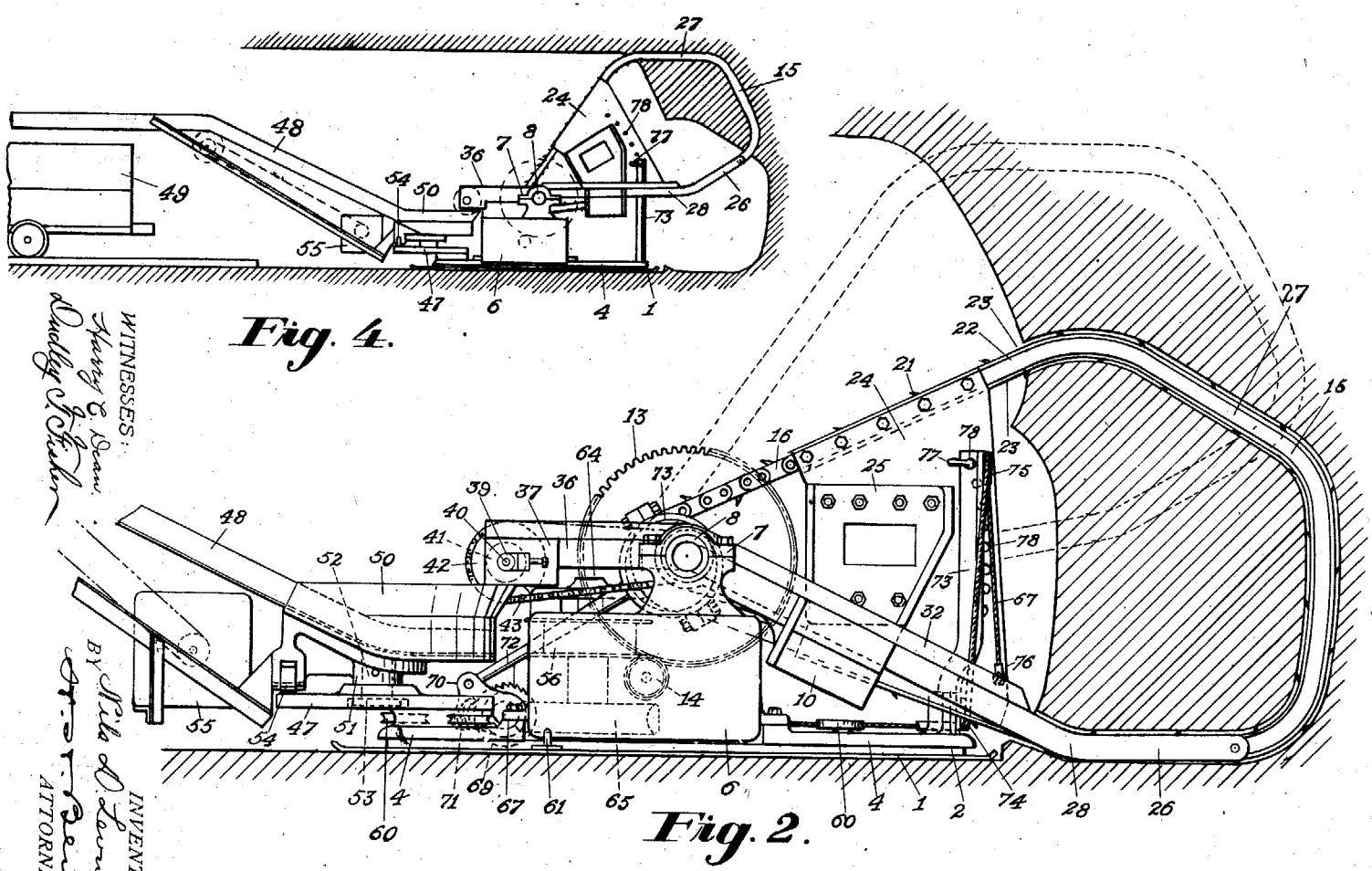
Figure 2 is a side elevation of the machine illustrated in Figure 1.
Figure 4 is a diagrammatic side elevational view showing the methods of removing the upper part of the coal vein.
Figure 3:
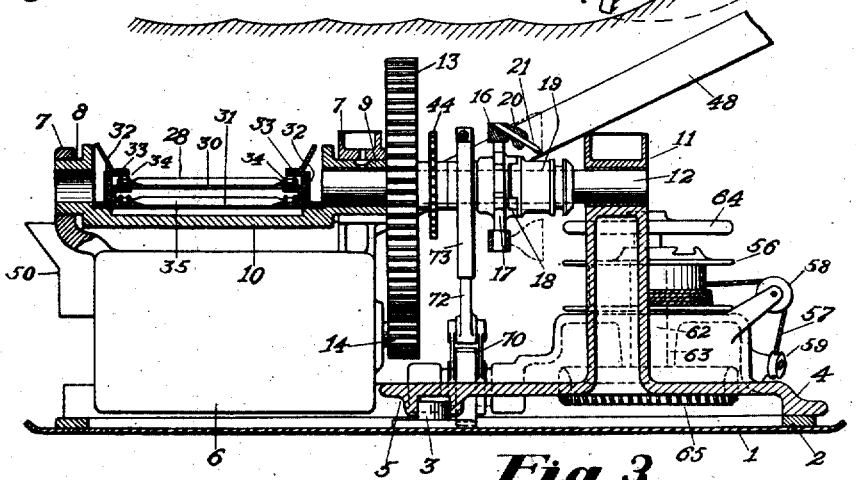
Figure 3 is a vertical cross section taken along the line 3—3 of Figure 1.

Referring to Figures 1, 2 and 3 of the drawings the numeral 1 indicates the sole plate adapted to rest upon and slide over the floor of the mine. To this sole plate is secured an annular ring 2 and an upstanding stud 3 concentric therewith. Bearing upon the ring 2 is a base plate 4 having a pivotal bearing 5 engaging the stud 3 about which said base plate is rotatable, forming a turn table upon which the operating parts of the machine are mounted. Attached to the base plate 4 is a motor 6 which supplies power to actuate the machine. For purposes of illustration, I have shown an electric motor, but it is to be borne in mind that any type of motor may be employed which is suitable to the condition under which the machine operates. Formed on the frame of the motor 6 are journal bearings 7 in which are mounted the trunnions 8 and 9 of the cradle casting 10 upon which is carried the cutting mechanism and the gathering devices of the machine as will hereinafter appear. Journaled in a bearing formed in the trunnion 9 and a second bearing 11 supported on a pedestal of the base plate 4 is a transverse shaft 12 from which the several elements of the machine are actuated, and which is itself driven through the spur gear 13 and armature pinion 14 from the motor 6.

The cutting mechanism comprises a vertically disposed loop shaped cutter frame 15 upon which travels a chain having renewable cutter bits adapted to cut a kerf in the coal body above, behind, and below sections of the coal vein to entirely sever them from the mass of the vein. The cutter chain 16 is of a type well known in the mining machine art, consisting of alternate strap and block links, and is engaged by a sprocket wheel 17 mounted upon the power shaft 12. Upon the hub of the sprocket wheel 17 is formed clutch teeth 18 adapted to engage with similar teeth of the clutch member 19 splined to the shaft in the manner common to such clutches. Formed upon the block links of the chain 16 are laterally projecting sockets 20 in which are secured the renewable bits 21.

The cutter frame is formed of a steel bar 22 of rectangular cross section to the sides of which are attached plates 23 the projecting edges of which form the guideways in which the chain 16 travels. The rectangular bar 22 is bent to form four sides of a pentagon and is secured at both ends to a vertical plate 24 which forms the fifth side of the pentagon and is attached by suitable bolts to the vertically extending flange 25 of the cradle casting 10. The cutter frame thus formed is adapted to rotary movement about the trunnions 8 and 9 and is so formed that when in its lower position the lower side 26 of the pentagon will be parallel with the general direction of the coal seam at the line of the floor, and, when in its elevated position, the upper side 27 of the pentagon will be parallel with the general direction of the coal seam at the line of the roof of the mine. When the mining machine is placed adjacent the coal face and the turn table 4 is rotated in a direction to cause the cutter bits 21 to engage the coal, there will be formed a loop shaped kerf extending above, behind, and below a section of the coal, entirely severing said section from the body of the vein. Owing to the natural cleavages of the coal, however, this severed block breaks off into smaller fragments of suitable size to be conveniently transported from the mines, and I have provided a gathering mechanism adapted to receive such fragments and convey them rearwardly of the machine. This gathering mechanism comprises a conveyer 28 of well known type mounted in the cradle casting 10, its forward end extending parallel with and in the same horizontal plane as the lower side 26 of the cutter frame to which it is attached by a broad apron 29 adapted to extend into the kerf to receive the fragments of coal as they break down. These fragments of coal are moved across the apron by the movement of the apron relative to the fixed body of coal by which they are pushed onto the conveyor to be carried rearwardly of the machine. The conveyer 28 comprises a trough composed of bottom plates 30 and 31 secured to side plates 32 by suitable angles 33. The angles 33 form guideways for the conveyer chain 34 and protect them from the material traveling in the conveyer trough. The chains 34 are connected at convenient intervals by cross bars 35 serving as scrapers to move the material along the trough of the conveyer. This trough is divided at the line of the trunnions 9 and 10, the rearward section 36 being supported in a horizontal position by the bracket 37 attached to the motor frame, while the forward section 28 maintains a fixed relation with the cutter frame. Mounted in bearings 39 of the bracket 37 is the head shaft 40 of the conveyer, to which is attached the head sprocket wheels 41 which engage the conveyer chains 34 to drive them. Mounted upon the overhanging end of the shaft 40 is a sprocket wheel 42 connected through the chain 43 with a sprocket wheel 44 fixed to the power shaft 12. A suitable clutch 45 is provided by which the sprocket wheel 42 may be connected to the head shaft 40. This clutch may be of any convenient type, but I prefer to use a clutch of the well known multiple disc friction type having a hand wheel 46 by which the pressure upon the disc of the clutch may be controlled to drive the conveyer and which, by the slippage of the disc, will prevent the breaking of the parts should the conveyer become jammed.

Pivotally mounted upon a circular extension 47 of the base plate casting 4 is a secondary conveyer 48 adapted to receive material from the gathering conveyer 36 and to convey it to suitably placed cars 49 in the rear of the machine. At its forward end this conveyer 48 is attached to and supported by a circular hopper casting 50 provided with a central hub 51 in which is fixed the pivot pin 52 about which the conveyer is rotatable. The pivot pin 52 extends through a central aperture in the base plate extension 47 and is provided with a broad head 53 adapted to engage the under surface of the base plate extension to resist the upward thrust of the pivot pin. The hopper casting 50 is provided with rollers 54 adapted to travel upon the face of the extension 47 and act as a fulcrum to support the overhanging weight of the conveyer. The conveyer 48 is provided with an auxiliary motor 55 by which it is actuated independently of the motor 6. The construction of this secondary conveyer 48 is similar to that of the gathering conveyer, and as its details form no part in the present invention, further description is not thought to be necessary at this time. By this method of mounting the secondary conveyer operative relations are preserved between the gathering conveyer 36 and the hopper 50, and the discharge end of the secondary conveyer 48 may be maintained at all times above the car 49 which is to be loaded.

The feeding mechanism consists of a winding drum 56 upon which is windable a feed rope 57. This feed rope 57 is adapted to pass around suitable guide sheaves 58, 59 and 60 and be connected to a suitable anchor 61 attached to the base plate 1. When the rope 57 is wound upon the drum 56 the turn table 4 will be caused to rotate about a pivot stud 3 to cause the cutter bits 21 to engage the coal to cut it.

The winding drum 56 is mounted upon a vertical shaft 62 journaled in a bearing 63 of the base plate 4, and is connectible therewith by a multiple disc friction clutch contained within the body of the drum 56 and controlled by a hand wheel 64 in the manner common with such clutches. Attached to the shaft 62 at its lower ends is a worm gear 65 which engages with a suitable worm 66 attached to a transverse shaft 67. The shaft 67 is supported in journal bearings 68 of the base plate 4 and to its farther end is secured a ratchet wheel 69. Mounted upon the shaft 67 at either side of the ratchet wheel 69 is a ratchet lever 70 having a pawl 71 arranged to engage the teeth of the ratchet wheel. To the ratchet lever 70 is connected an eccentric rod 72 which engages an accentric 73 attached to the power shaft 12. When now the power shaft 12 is rotated the eccentric causes the oscillation of the ratchet lever to rotate the shaft 67 which through the worm and worm wheel rotates the vertical shaft 62 to rotate the winding drum 56 to wind the rope. The guide sheaves 60 are disposed about the periphery of the base plate 4 in such manner that the feed rope 57 may be carried around the turn table in either direction to be attached to the anchor 61. By this arrangement the operator may cause the rotation of the turn table either in the direction to engage the coal to cut it, or in the opposite direction to position the cutter arm preparatory to beginning a new cut.

In order to facilitate handling the machine in the mines, the vertical width of the cutter frame 15 is made less than the total height of the coal vein which is to be mined, and, after the lower portion of the coal has been removed, the cutter frame is rotated upon the trunnions 8 and 9 to its upper position and a second cut is made to remove the upper portion of the coal. This vertical movement of the cutter frame is provided for in a vertical arm 73 attached to the base plate 4 and extending parallel to and adjacent the rearward sides of the plate 24 of the cutter frame. Mounted upon this vertical arm 73 are guide sheaves 74 and 75 over which the feed rope 57 may be led, to be attached to the projection 76 of the plate 24. When the rope 57 is so arranged the cutter frame may be lifted, by winding the rope, to the desired elevation in which position it may be secured by the pin 77 arranged to be inserted in suitable apertures 78 in the vertical arm 73 and cutter frame plate 24.

In Figures 9 to 20 inclusive, I have shown a modification of the above described machine wherein the sole plate 1 is made circular in form concentric with the ring 2. The outer edge of the plate 1 is turned upward as shown at $1^a$, to facilitate sliding the machine over the floor of the mine, and is then turned outward to form a horizontal flange $1^b$ provided at spaced intervals with a plurality of apertures $61^a$ into which the hook 81 of the feed rope 57 may be engaged. Concentric with the ring 2 is an upstanding pivot stud 3 which engages a pivot bearing 5 formed at the center of the main frame casting 4. The main frame 4 bears upon the ring 2 to form a turn table upon which are mounted the operative parts of the machine. Mounted upon the main frame 4 is an electric motor 6 by which power is supplied to actuate the machine. Attached to the side of the motor 6 is starting box 82 by which the motor is controlled. The starting box is provided with a controlling handle 83 connected with the internal mechanism of the starting box by which the motor may be started or stopped, and with a second operating handle 84 connected with a reverse switch within the starting box casing by which the direction of rotation of the armature of the motor is controlled. A suitable conductor cable 85 is provided to connect the motor with a convenient source of electric supply. Formed on the frame of the motor 6 are journal bearings 7 in which are mounted the trunnions 8 and 9 of the cradle casting 10 upon which the cutting mechanism and gathering mechanism of the machine are mounted. Journaled in a bearing formed in the trunnion 9 and in a second bearing 11 attached to the main frame casting 4 is a power shaft 12 from which is actuated the several elements of the machine. This power shaft 12 is connected with the motor 6 through the spur gear 13 and armature pinion 14. Rotatably mounted upon the shaft 12 is a sprocket wheel 17 upon the hub of which is formed clutch teeth 18 adapted to engage with similar teeth on the clutch member 19 splined to the shaft 12. The clutch member 19 is provided with a groove 86 engaged by the fingers 87 on the shifting lever 88 by which the clutch may be controlled. On this shifting lever 88 is formed a lug 89 having an aperture adapted to register with either of two apertures 90 in a flange of the pedestal casting 11 to receive the pin 91 to hold the clutch in either of its operative positions. The sprocket wheel 17 engages a cutter chain 16 adapted to travel in a groove formed in the side of a loop shaped cutter frame 15. The chain 16 is of a type well known in the mining machine art consisting of alternate strap and block links, the latter having laterally projecting sockets 20 in which are fixed the cutter bits 21.

The cutter frame is formed of a steel bar 22 of rectangular cross section to the sides of which are attached plates 23 the projecting edges of which form guideways in which the cutter chain 16 travels. This rectangular bar is bent to form four sides of a pentagon, and is secured at both ends to a vertical plate 24 which forms the fifth side of the pentagon. The plate 24 is attached to a slide casting 92 adapted to movement longitudinally of the cutter frame in the guideways 93 of a vertically extending flange 25 of the cradle casting 10. The position of the slide casting 92 longitudinally of the guideways 93 is controlled by an adjusting screw 94 to regulate the tension of the cutter chain 16 in the manner common to chain cutting mechanisms. The cutter frame thus formed is adapted to rotary movement about the trunnions 8 and 9 and is so formed that when in its lower position the lower side 26 of the pentagon will be parallel with the general direction of the coal seam at the line of the floor and when in its elevated position the upper side 27 of the pantagon will be parallel with the general direction of the coal seam at the line of the roof of the mine.

The gathering mechanism comprises a conveyer 28 of well known type mounted in the cradle casting 10, its forward part extending parallel with and in the same horizontal plane as the lower side 26 of the cutter frame to which it is attached by the broad apron 29 adapted to extend into the kerf beneath the coal to receive the fragments as they break off from the mass of the vein. These fragments of coal are moved across the apron 29 by the movement of the apron relative to the fixed body of the coal, and pass onto the conveyer to be carried rearwardly of the machine.

The conveyer comprises a trough formed of the plates 30 and 31 attached to the side plates 32 by suitable angles 33. The angles 33 form guideways for the conveyer chains 34 and protect them from material traveling in the conveyer trough. The chains 34 are connected at convenient intervals by cross bars 35 which serve as scrapers to move material along the trough. At the outer end of the conveyer these chains pass around the head sprockets 95 and at the inner end of the conveyer around the guide bar 96 over the edge of which the chains readily slide. This guide bar 96 extends across the conveyer structure and is movable longitudinally thereof by the adjusting screws 97 for the purpose of regulating the tension of the chains 34. At the line of the trunnions the conveyer trough is divided into two parts, the inner part being attached to the cradle casting 10, is rotatable with the cutter frame about the trunnions and the outer part 36 is maintained in a substantially horizontal position by a bracket 37 attached to the frame of the motor 6. The head sprocket wheels 41 are attached to the head shaft 40 journaled in bearings 39 of the bracket 37 and driven through the sprocket wheel 42 and 44 and the chain 43 from the power shaft 12. The sprocket wheel 42 is connectible to the head shaft 40 by a suitable clutch 45 which may be of any convenient type, but I prefer to use a clutch of the well known multiple disc friction type having a hand wheel 46 by which the pressure upon the discs of the clutch may be regulated to drive the conveyer, and which, by the slippage of the disc, will prevent the breakage of the parts should the conveyer become jammed.

Material is delivered by the gathering conveyer 36 into a circular hopper 50ª pivotally supported upon an extension of the base plate casting 47ª and is carried from this hopper to the car 49, conveniently placed upon the mine track in the rear of the machine, by a conveyer 48ª. The conveyer 48ª may be of any convenient type, but I prefer to use a conveyer of the same general type as the gathering conveyer, having a trough composed of bottom plates 98 and 99 joined to side plates 100 by suitable angles 101. In the guideways formed by the angles 101 travel the endless chains 102 which are joined together at spaced intervals by the scraper cross bars 103. This conveyer is self-contained being provided with an electric motor 55ª connected through suitable gearing with the sprocket wheels 104 in engagement with the under strands of the conveyer chains to drive them. Intermediate the ends of the conveyer 48ª the trough is divided, the parts being connected together by a hinge 105, and means is provided in the arms 106, rope 107 and winding mechanism 108 to control the elevation of the delivery end of the conveyer to accommodate cars of varying heights. In Figure 16, I have illustrated the preferred construction of the pivotal mounting to the hopper 50ª. Mounted upon the extension 47ª of the base frame are a plurality of rollers 54ª upon which bears the base plate 109 of the hopper construction. At the center of the extension 47ª is an aperture through which extends a pivot bolt 52ª having a broad head 53ª, to engage the upper surface of the base plate 109, and at its lower end a nut 110 which bears upon the under side of the extension casting to resist upward movement of the pivot pin. Between the nut 110 and the extension casting 47ª I preferably insert a ball bearing 111 to reduce the friction between the parts. By this construction the rollers 54ª act as fulcrums to support the overhanging weight of the loading conveyer and allow it to be freely rotated about the pivot pin 52ᵃ so that the hopper 50ᵃ may at all times receive material from the gathering conveyer and the discharge end of the loading conveyer may maintain its relation with the car to be loaded.

The feeding mechanism consists of a winding drum 56 upon which is windable the feed rope 57 having a suitable terminal hook 81 adapted to engage the apertures 61ᵃ of the base plate 1. Sheaves 58ᵃ, 59ᵃ and 60ᵃ are provided to guide the rope to the desired point of attachment. The sheave 59ᵃ is mounted in a caster support 112 having trunnions 113 journaled in bearings of the main frame in such manner that the rope 57 may be lead off in any desired direction.

As shown in Figure 13 the winding drum 56 is mounted upon a vertical shaft 62 to which it may be connected by a multiple disc clutch contained within the body of the drum and controlled by the hand wheel 64 in a manner common to such clutches. Attached to the hand wheel 64 is a sprocket wheel 114 around which passes an endless chain 115 extending beneath the conveyer 36 to the sprocket wheel 116 mounted upon a vertical shaft 117. The shaft 117 is journaled in a bearing 118 formed on the cap of the journal bearing 7. Upon the upper end of the shaft 117 is mounted a hand wheel 119. By this arrangement the friction clutch within the drum 56 may be controlled from either side of the machine.

The shaft 62 is journaled in a bearing 63 of the base frame casting 4 and is attached at its lower end to a worm gear wheel 65. The worm gear 65 is engaged by a worm 66 attached to a transverse shaft 67 journaled in suitable bearings 68 of the base frame casting 4. Attached to the shaft 67 is a ratchet wheel 69 adapted to be engaged by the pawl 71 carried by the ratchet lever 70. The ratchet lever 70 is connected with an eccentric rod 72 which engages the eccentric 73 mounted upon the power shaft. By the rotation of the eccentric 73 the ratchet lever 70 is caused to oscillate thereby driving the ratchet wheel 69 to rotate the worm 66 and drive the winding drum 56. A curved metallic shield 120 adapted to engage the pawl 71 is supported in position concentric with the ratchet wheel 69 by the pivoted arms 121 mounted upon the shaft 67 at either side of the ratchet wheel. On the arms 121 is formed an extension arm 122 connected by a link 123 with a bell crank 124 attached to a shaft 125 having a controlling handle 126 within convenient reach of the operator. By the rotation of the shaft 125 the shield 120 is moved relative to the ratchet wheel to engage the pawl 71 during a greater or less part of its oscillation thereby controlling the rate of rotation of the ratchet wheel and the consequent rate of winding the feed rope 57. The vertical movement of the cutter frame may be effected in any preferred manner. In Figures 9, 10, 12 and 17 of the drawings I have illustrated hydraulic devices adapted to this purpose comprising an upright cylinder 127 attached to the vertically extending flange 25 of the cradle casting 10. Within the cylinder 127 is a piston 128 having a socket wherein bears the upper end of the piston rod 129 pivotally connected to the base frame 4 by the brackets 130 and hinge pin 131. The cylinder 127 is connected through a suitable pipe 132 with a pressure pump 133 having a plunger 134 connected to the eccentric rod 135 of the eccentric 73ᵃ mounted upon the power shaft 12. A suction pipe 136 extends from the pump 133 to the slack water tank 137. A control lever 138 is provided upon the pump, by which the pump valves are controlled to cause water to flow from the slack tank into the cylinder 127 to lift the cutter arm, from the cylinder 127 into the slack tank 137 to depress the cutter arm, or to prevent the escape of water from the cylinder 127 thereby locking the cutter arm in any desired position.

Figure 5:
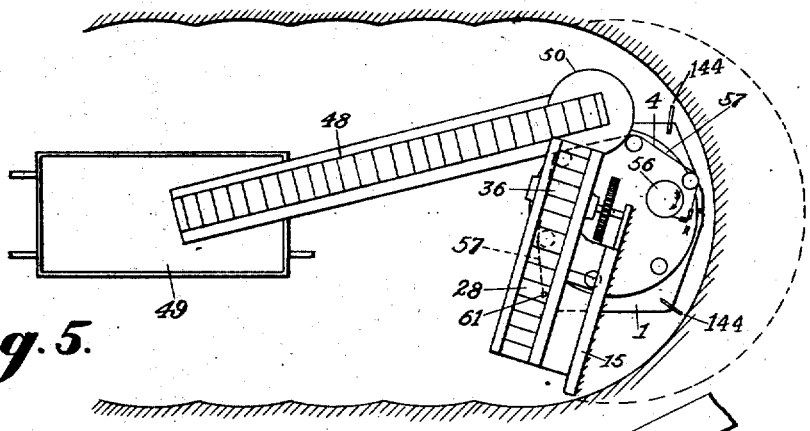
Figure 6:
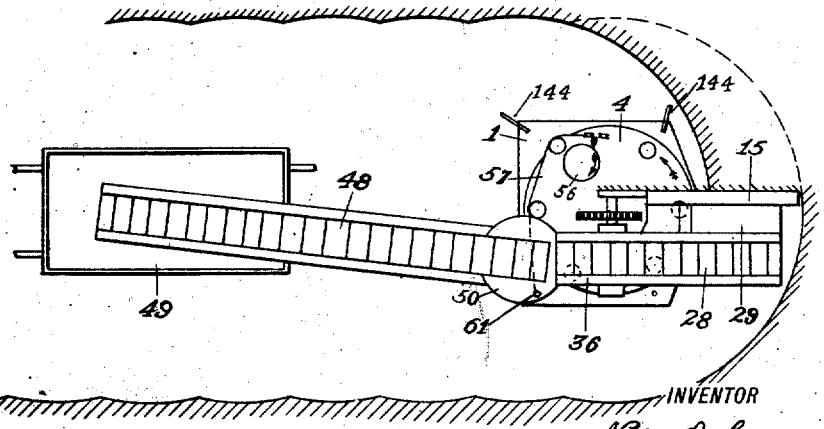
Figure 7:
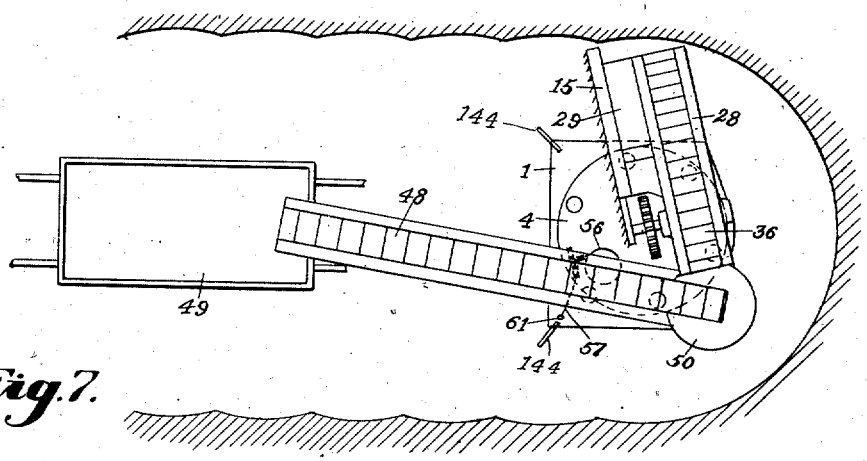

To operate by the room and pillar system the machine is placed, as shown in Figure 5, on the central line of the mine room adjacent the coal face, the cutter frame 15 turned to the right, and the car 49 positioned beneath the discharge end of the loading conveyor 48. The feed rope 57 is drawn out from the winding drum 56, passed around the guide sheaves 60 in the anti-clockwise direction and attached to the anchor 61. The cutter chain is then started and the feed rope wound up to rotate the main frame 4 to cause movement of the cutter frame 15 from right to left. As the cutter frame advances a kerf is formed in the mine wall extending above, behind and beneath a section of the coal, entirely severing it from the mass of the vein. Owing to the natural cleavages of the coal, this section breaks up into smaller fragments of a size convenient to be handled and these fragments are received by the gathering conveyer 28, carried rearwardly of the machine and deposited in the car 49. In Figure 6 is illustrated the relation of the parts when the cutter frame 15 is at the middle of the cut, and in Figure 7 is shown the relation of the parts when the cutter frame has reached the left hand side of the room and completed the cut.

Figure 8:
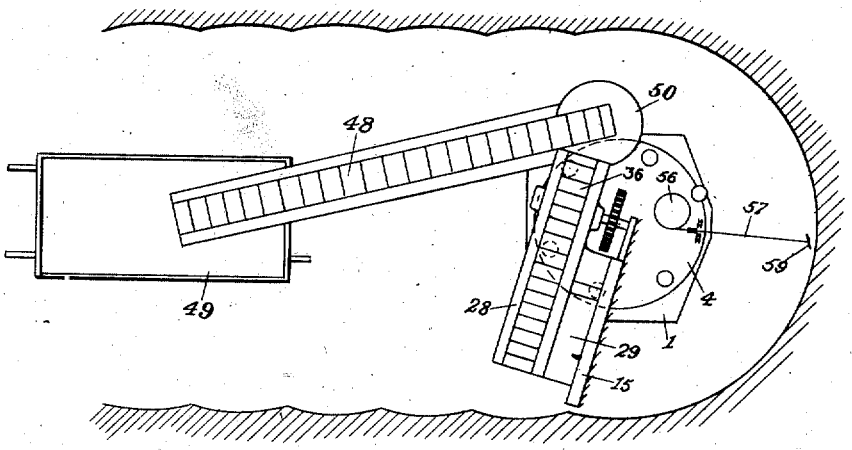

After completing a cut across the lower part of the coal face, the feed rope 57 is disconnected from the anchor 61, passed around the guide sheaves 60 in the opposite direction and again attached to the anchor 61. By then winding the rope 57 the turn table is rotated from left to right to restore the cutter arm to the position of beginning. The feed rope is then disconnected from the anchor 61, passed around the sheaves 74 and 75 of the vertical arm 73 and attached to the projection 76 of the cutter frame. The pin 77 is then withdrawn and the feed rope wound to raise the cutter arm to its upper position, as illustrated in Figure 4. When the cutter arm has reached the desired elevation, the pin 77 will be restored to the aperture 78 to lock the cutter frame in that position. The feed rope will again be connected to the anchor 61 to move the cutter arm in a direction to cut the coal. When the machine is equipped with the hydraulic elevating devices illustrated in Figures 9, 10, 12 and 17, the elevation of the cutter frame is effected by the manipulation of the control lever 138 to direct the flow of water into or from the cylinder 127. After the completion of the upper cut the cutter frame 15 will be restored to its lower position at the right hand side of the machine. The feed rope 57 is drawn out from the drum 56 and attached to a suitable abutment 79 adjacent the coal face, as illustrated in Figure 8. By winding the rope 57 the machine will be drawn forward over the floor of the mine to the position shown in Figure 5 and the operation as above described repeated.

To operate under the long wall system the machine is placed adjacent the right hand end of the working face with the cutter frame extending to the right as when placed preparatory to beginning the operation in the room and pillar system. The cutter frame 15 is then rotated towards the left until it stands at right angles to the working face, in a position similar to that shown in Figure 6. A pin 139 is then inserted in one of the apertures 61[a] to engage the bracket 130 and prevent further rotation of the main frame 4 relative to the sole plate 1. A snatch-block 140 having a hook 141 for insertion in the aperture 61[a] is then attached at a suitable point on the sole plate 1, the feed rope 57 drawn out from the drum 56 passed around the sheave 142 of the snatch-block and its end secured to an anchor jack 143 positioned in advance of the machine adjacent the coal face. By the proper positioning of the snatch-block 140 and the anchor jack 143 relative to the other parts of the machine, there may be produced such a balance of strains when the feed rope 57 is wound up that the machine will be moved bodily along the coal face, as illustrated in Figure 21.

When the coal to be mined is comparatively hard and offers considerable resistance to the advance of the cutting devices, the friction of the sole plate 1 upon the floor of the mine may be insufficient to resist the reaction of a feeding mechanism. Under such circumstances resort is had to the customary jack-posts 144 which may be placed to engage the sole plate at any convenient points and extend to the roof or wall of the mine to prevent movement of the plate 1 upon the floor of the mine. The apertures 61[a] afford convenient means of engagement of the pointed end of such a jack. The position of these jack posts 144 will depend upon local conditions which are well understood by those skilled in the manipulation of mining machines.

What I claim is:—

1. In a mining machine of the class described, the combination of a main frame, rotatable around a vertical axis, a vertically disposed loop-shaped guide frame projecting from the main frame, a cutter chain arranged to travel around said guide frame to sever a block of material, an outward extended endless conveyer continuously rotating in vertical planes and mounted in fixed position relatively to said loop guide frame, and having its inner end arranged behind the active part of the loop cutters, and means to rotate the main frame and cause engagement of the cutters with the coal.

2. In a mining machine of the class described, the combination of the horizontally rotary main frame, the loop-shaped guide frame projecting from the main frame, the cutter chain arranged to travel around said loop guide, the outward extending endless conveyer continuously traveling in vertical planes, and having its receiving end behind the active part of the loop cutter, a second endless conveyer, having its receiving end arranged to receive material from the discharge and of the first conveyer, and a frame carrying said second conveyer and mounted pivotally on the main frame.

3. In a mining machine of the class described, the combination of the horizontally rotating main frame, the loop-shaped guide frame carried by the main frame, the cutter chain traveling on the loop guide frame, the primary endless conveyer traveling continuously in vertical planes, and fixed in relation to the loop guide frame, and the second endless conveyer mounted on the main frame, said two conveyers being movable to different angular relations with each other while in operation and while the cutting mechanism is horizontally rotating.

4. In a mining machine of the class described, the combination of the horizontally rotary main frame, the loop-shaped guide frame extending from the main frame, the cutter chain traveling around the guide frame, the endless conveyer on the main frame traveling continuously in vertical planes, and having its receiving end arranged immediately behind the operative parts of the loop cutter, and fixed relatively to the main frame, the second endless conveyer pivotally mounted on the main frame, and power devices for rotating the cutters horizontally in one direction, the adjacent ends of the conveyers being both simultaneously movable in a direction opposite to that aforesaid.

5. In a mining machine of the class described, the combination of a horizontally rotatable main frame, a vertically disposed loop-shaped guide frame, projecting from the main frame, a cutter chain arranged to travel on the guide frame and surround a block of material as it is being severed, an endless conveyer on the main frame traveling continuously in vertical planes, and having its receiving end behind the chain guide frame, means to rotate the main frame and means to vertically adjust the loop guide frame relatively to the main frame.

6. In a mining machine of the class described, the combination of the main frame, rotatable about a vertical axis, a vertically disposed loop-shaped guide frame projecting from the main frame, a cutter chain traveling on the guide frame around a block of material as it is being severed, a conveyer frame attached to and movable with the loop guide frame, an endless conveyer on said frame rotating continuously in vertical planes, and having its receiving end below and behind the loop cutter and arranged to travel on lines inside of the normal coal face, and a second conveyer on the main frame arranged to receive material from the first conveyer while the latter is bodily rotating, and to deliver said material at a substantially fixed point.

7. In a mining machine, the combination of the pan-like wide smooth surfaced base, adapted to rest upon and slide over a mine floor, a main frame on the base rotatable around a vertical axis, a vertically disposed loop-shaped guide frame projecting from the main frame, a cutter chain arranged to travel on the guide frame in a loop-like path, an endless conveyer attached to and movable with the guide frame and traveling continuously in vertical planes, and having its receiving end behind and below the guide frame, power devices on the main frame, and means to rotate said frame on the base, or, at option, to move the base and the parts supported thereon bodily along the walls of the mine.

8. In a mining machine, the combination of the pan-like wide smooth surfaced base, adapted to rest upon and slide over a mine floor, a main frame on the base rotatable around a vertical axis, a vertically disposed loop-shaped guide frame projecting from the main frame, a cutter chain arranged to travel on the guide frame in a loop-like path, an endless conveyer attached to and movable with the guide frame and traveling continuously in vertical planes, and having its receiving end behind and below the guide frame, a winding drum on the main frame, a rope windable upon the drum and adapted either to be connected to the base to produce rotation of the main frame relative to the base, or, at option, to an abutment in advance of the machine to bodily move the machine relatively to the wall of the mine.

9. In a mining machine, the combination of the pan-like wide smooth surfaced base, adapted to rest upon and slide over a mine floor, a main frame on the base rotatable around a vertical axis, a vertically disposed loop-shaped guide frame projecting from the main frame, a cutter chain arranged to travel on the guide frame projecting from the main frame, in a loop-like path, a manually controllable power actuated winding drum upon the main frame, a rope windable upon the drum and adapted to either connected to the supporting base to rotate the main frame thereon or, at option, connected to an abutment in advance of the machine to bodily move the machine relative to the wall of the mine.

10. In a mining machine of the class described, a vertically disposed pentagonal cutter frame adapted to vertical adjustment about a pivotal support, the proportions of the frame being such that when in its lower position of adjustment the lower side of the pentagon will extend in a plane substantially parallel with the general direction of the vein at the floor of the mine, and when in its upper position of adjustment the upper side of the pentagon will extend in a plane substantially parallel with the general direction of the vein at the roof of the mine, cutting devices carried by the cutter frame adapted to sever a section of material from the wall of the mine, and means to move the support to cause the cutting devices to engage the material to be mined.

11. In a mining machine, the combination of a supporting base, a main frame mounted on said base adapted for rotation thereon about a vertical axis, pivotally mounted cutting mechanism projecting laterally from said main frame and adapted to cut a section of material from the wall of the mine, means to adjust said cutting mechanism angularly about its pivot, means to lock the main frame against movement relative to the base, and means adapted either to rotate the main frame relative to the base or to move the entire machine bodily relative to the material to be mined.

12. In a mining machine, the combination with a supporting base, a main frame upon the base adapted to rotation about a vertical axis, a transverse power shaft mounted upon the main frame, a vertically disposed laterally projecting loop shaped cutting mechanism mounted for pivotal adjustment about said power shaft and adapted to sever a section of material from the mine wall, a continuously acting conveyer attached to said cutting mechanism and movable therewith in position to receive the severed material and transport it rearwardly of the machine, feeding devices adapted to move the main frame relative to the base to cause the cutting mechanism to engage the material to be mined or to move the machine bodily relative to the wall of the mine, means to rotate the power shaft, and means to actuate the cutting mechanism, the conveyor mechanism and the feeding devices from the power shaft.

13. In a mining machine, the combination with a supporting base, a main frame upon the base adapted to rotation about a vertical axis, a transverse power shaft mounted upon the main frame, a vertically disposed laterally projecting loop shaped cutting mechanism mounted for pivotal adjustment about said power shaft, means to vertically adjust said cutting mechanism, a continuously acting conveyer attached to said cutting mechanism and movable therewith in position to receive the severed material and transport it rearwardly of the machine, feeding devices adapted to move the main frame relative to the base to cause the cutting mechanism to engage the material to be mined or to move the machine bodily relative to the wall of the mine, means to rotate the power shaft, and means to actuate the cutting mechanism, the adjusting means, the conveyer and the feeding mechanism from said power shaft.

14. In a mining machine, the combination with a main frame a transverse power shaft mounted upon the main frame, a vertically disposed laterally projecting loop shaped cutting mechanism mounted for pivotal adjustment about said power shaft and adapted to sever a section of material from the mine wall, a continuously acting conveyer attached to and movable with said cutting mechanism in position to receive the severed material and transport it rearwardly of the machine, means to vertically adjust the cutting mechanism, feeding devices adapted to move the main frame to cause the cutting mechanism to engage the material to be mined, means to rotate the power shaft, and means to actuate the cutting mechanism, the adjusting means, the conveyer and the feeding devices from said power shaft.

15. In a mining machine, the combination with a main frame, a vertically disposed loop shaped guide frame projecting laterally from the main frame, means to vertically change the position of the guide frame relative to the main frame, a cutter chain arranged to travel on the guide frame and adapted to sever a section of material from the mine wall, a continuously acting conveyer attached to and movable with the guide frame in position to receive the severed material, and means to move the main frame to cause the cutting mechanism to engage the material to be mined.

16. In a mining machine, the combination with a supporting base, a main frame upon the base adapted to rotation about a vertical axis, cutting mechanism projecting laterally from the main frame adapted to sever a section of material from the mine wall, means to lock the main frame against movement relative to the base, and means upon the main frame adapted to be connected at option either to the supporting base to produce rotation of the main frame relative to said base or to an abutment in advance of the machine to move the machine bodily relative to the material to be mined.

17. In a mining machine, the combination with a main frame adapted to rotation about a vertical axis, a vertically disposed loop shaped guide frame projecting laterally from said main frame, a cutter chain arranged to travel around said guide frame to sever a block of material from the wall of the mine, an outwardly extended continuously traveling endless conveyer mounted in fixed relation to the loop shaped guide frame and having its inner end arranged behind the active part of said loop cutters, and means to rotate the main frame to cause the engagement of the cutters with the material to be mined.

18. In a mining machine, the combination of a main frame adapted to rotation about a vertical axis, a vertically disposed loop shaped guide frame projecting laterally from said main frame, a cutter chain arranged to travel around said guide frame to sever a block of material from the wall of the mine, an outwardly extended continuously traveling endless conveyer mounted in fixed relation to said loop shaped guide frame and having its inner end behind the active part of said loop cutter, and a second endless conveyer mounted upon said main frame in position to receive material from said primary conveyer the said two conveyers being movable to different angular relations with each other while in operation and while the cutting mechanism is horizontally rotating.

19. In a mining machine, the combination of a pan-like wide smooth surfaced base adapted to rest upon and slide over the floor of a mine, a main frame upon the base adapted to rotation about a vertical axis, cutting mechanism projecting laterally from the main frame adapted to form a kerf above, behind and below a section of the mine wall to sever a block of material therefrom, and means upon the main frame to at option either rotate the main frame relative to the base or to move the machine bodily relative to the material to be mined.

20. In a mining and loading machine, the combination with a main frame, of a supplemental frame mounted to swing on an upright axle on said main frame, of core cutting mechanism having an unobstructed core opening and mounted on said supplemental frame, and loading apparatus comprising conveyer mechanism extending from a position back of the core cutting mechanism and along said main frame back of said upright axis to loading position, a portion of said conveyer mechanism being adapted to rest flat on the floor of the mine chamber for movement along the path of said core cutting mechanism.

21. In a mining and loading machine, the combination with kerf-cutting mechanism, of a main frame, a supplemental frame mounted to swing on an upright axis on said main frame, a tertiary frame carrying said kerf-cutting mechanism and mounted to swing vertically on a transverse axis on said supplemental frame, conveyer mechanism having a forward section pivotally connected at its rear end to said supplemental frame on a transverse axis, and a pivoted connection between said tertiary frame and said forward conveyer section to cause the latter to be lifted and lowered corresponding to the lifting and lowering of said kerf-cutting mechanism.

22. In a mining and loading machine, the combination with dislodging mechanism, of loading apparatus comprising a traveling conveyer extending to a receiving position spaced back from said dislodging mechanism, said traveling conveyer having superposed portions traveling in opposite directions to and from such receiving position, supporting framework for said dislodging mechanism and said traveling conveyer, means for driving said dislodging mechanism, means for moving said framework to effect feeding movement of said dislodging mechanism and the movement of said conveyer with said dislodging mechanism, means connected between said conveyer and said dislodging mechanism for directing dislodged material onto said conveyer, and a shield extending along the rear side of said conveyer remote from the dislodging mechanism to prevent material directed onto said conveyer from moving off the latter.

23. In a mining and loading machine, the combination with a stationary base frame adapted to rest on the floor of a mine chamber, of a supplemental frame mounted on said base frame for rotary movement relatively thereto on an upright axis, core cutting mechanism mounted on said supplemental frame for rotary movement therewith in position to cut an arcuate core in a mine wall near said frames, a motor mounted on said supplemental frame and movable bodily therewith, mechanism between said motor and said core cutting mechanism for driving the latter, means for feeding said core cutting mechanism by rotating said supplemental frame on said upright axis relatively to said supporting frame, said feeding means comprising rope winding mechanism and a rope having a free end adapted to be anchored, sectional conveyer mechanism carried by said supplemental frame, the rear section being pivotally connected to another section extending across the supplemental frame adjacent said upright axis and to the rear thereof as well as to the rear of the core cutting mechanism relative to the direction of feed thereof, and means for operating said conveyer mechanism to deliver material dislodged by said core cutting mechanism from the position back thereof across the supplemental frame and thence to the rear section of the conveyer and into a mine car adapted to be located on the track back of said base frame, while the forward portion of the conveyer mechanism rotates with the supplemental frame and said core cutting mechanism and the rear section of the conveyer mechanism remains in delivery communication with said mine car.

24. In a mining machine, the combination with a supporting frame, of core cutting mechanism mounted for swinging adjustment on said supporting frame, said core cutting mechanism having an unobstructed core opening therethrough between spaced apart upper and lower straight runs extending in converging planes from said supporting frame, and means for operating said core cutting mechanism including the feed thereof.

25. In a mining machine, the combination with a supporting frame, of a loop chain core cutter having an unobstructed core opening therethrough and spaced apart upper and lower straight runs extending from said supporting frame in converging planes, means for driving said core cutting mechanism, means for feeding said core cutting mechanism on an upright axis to effect the cutting of a core extending through said unobstructed core opening, and means for adjusting the position of said core cutting mechanism relative to said supporting frame to effect cutting of adjacent cores the remote surfaces of which are substantially parallel.

26. In a mining machine, the combination with supporting framework, of a cutter frame mounted on said supporting framework for upright and lateral swinging movements, said cutter frame having an unobstructed core opening therethrough and having upper and lower straight runs in converging planes, a chain cutter mounted on said cutter frame, means for driving said chain cutter, means for swinging said cutter frame laterally on an upright axis to feed said chain cutter to effect cutting of a core with its lower surface approximately in a horizontal plane, and means for adjusting said cutter frame to another position to enable said chain cutter to cut a core with its upper surface approximately in a horizontal plane.

27. In a mining machine, the combination with a main frame, of loop chain core cutting mechanism having an unobstructed core opening therethrough with the upper and lower straight runs extending on converging planes relative to said main frame, means for driving said core cutting mechanism, means for feeding said core cutting mechanism along lines in horizontal planes to cut a core, and means for holding said core cutting mechanism in adjusted position relative to said main frame to effect the cutting of a core with its lower surface in an approximately horizontal plane when the core cutting mechanism is in one position and the cutting of a core with the upper surface thereof in an approximately horizontal plane when said core cutting mechanism is adjusted to another position.

28. In a mining machine, the combination with a supporting frame, of core cutting mechanism having an unobstructed core opening therethrough and mounted on said supporting frame to swing relatively thereto, means for driving said core cutting mechanism, means for swinging said core cutting mechanism relatively to said supporting frame on an upright axis to effect the feed of said core cutting mechanism, said core cutting mechanism having spaced apart runs extending in converging planes relative to said supporting frame, means for supporting said core cutting mechanism on said supporting frame to swing on an axis extending transversely of the axis of feeding swinging movement, and means for holding the core cutting mechanism in adjusted position.

29. In a mining machine, the combination with a supporting frame, of a cutter frame having an unobstructed core opening therethrough between spaced apart runs extending in converging planes relative to said supporting frame, an endless chain cutter mounted on said cutter frame, means comprising a sprocket wheel for driving said chain, means for tilting said cutter frame relatively to said supporting frame on the axis of said sprocket wheel to adjust the positions of said spaced apart runs relatively to said supporting frame, and means for feeding said cutter frame during the driving of said chain cutter to effect the cutting of a core in the adjusted position of said cutter frame including said spaced apart runs.

30. In a mining machine, the combination with a supporting frame, of a supplemental frame pivotally mounted on said main frame for arcuate movement relatively to said supporting frame on an upright axis, a cutter frame pivotally connected on a horizontal axis for upright swinging movement relatively to said main frame, said cutter frame being elongated and having an unobstructed core opening therethrough between spaced apart runs in converging planes, the lower run extending approximately along the floor of a mine chamber and the upper run extending downwardly toward the floor away from said frame when said frame is in its lower position, and a chain cutter mounted on said cutter frame to travel around said unobstructed core opening, means comprising a sprocket wheel mounted on the horizontal axis of swinging movement of said cutter frame for driving said chain cutter, means for swinging the supplemental frame on its upright axis relatively to said main frame to effect lateral swinging movement of said cutter chain to cut an arcuate core extending through said unobstructed core opening, and means for swinging said cutter frame upwardly into position where the upper run will be approximately in a horizontal plane along the roof of the mine chamber.

31. In a mining and loading machine, the combination with a supporting frame, of a supplemental frame mounted on said supporting frame for arcuate movement relatively thereto on an upright axis, loop chain core cutting mechanism comprising a chain cutter and a driving sprocket, conveyer mechanism comprising a driving sprocket and mounted on said supplemental frame to move arcuately with said core cutting mechanism in position to receive dislodged material from the latter, a motor mounted on said supplemental frame, driving connections between said motor and said chain cutter sprocket, and means for extending the driving connections to the conveyer sprocket to effect the operation of said chain cutter and the operation of said conveyer mechanism in unison.

32. In a mining machine, the combination with a main frame, of supplemental frame pivoted thereto, of a core cutter having upper and lower runs relatively inclined in intersecting planes and pivotally connected to said supplemental frame on an axis transverse to that of the supplemental frame and spaced therefrom, and means for operating said core cutter including the feed thereof to cut cores leaving the floor and roof with surfaces in substantially horizontal planes.

33. In a mining machine, the combination with a main frame, of a supplemental frame mounted on said frame for rotary movement on an upright axis, core cutting mechanism pivoted to said supplemental frame for rotary movement on an axis transverse to that of said upright axis and spaced therefrom, said core cutting mechanism having upper and lower runs in intersecting planes, and means for operating said core cutting mechanism including rotary movement of said upright axis to effect the feed of said core cutting mechanism to cut cores along the floor and roof and leave the surfaces of said floor and roof in spaced apart horizontal planes.

34. In a mining machine, the combination of a supporting frame, a cutter frame carried thereby, cutting means on said frame to form a lower kerf, cutting means on said frame to simultaneously form an upper kerf disposed on a plane inclined upwardly from its inner end to the face of the coal, means for driving said cutter means, and means for moving said frame and cutting means through the coal.

35. In a mining machine, the combination of a supporting frame, a movable cutter frame carried thereby, cutting means on said frame to form a lower kerf, cutting means on said frame to simultaneously form an upper kerf disposed on a plane inclined upwardly from its inner end to the face of the coal, means for driving said cutting means, and means for swinging said frame and cutting means through the coal to make an arc-shaped cut.

36. In a mining machine, the combination of a supporting frame, a loop shaped cutter frame carried thereby and having a substantially horizontal lower frame member, and an upper frame member inclined upwardly from its inner end to the face of the coal, a cutter chain carried by said frame, means for driving said chain, and means for moving said frame and chain through the coal.

37. In a mining machine, the combination of a supporting frame, a cutter frame in the form of a continuous loop carried thereby and having a lower frame member adapted to lie in a horizontal plane, and an upper frame member adapted to lie in a plane inclined upwardly from its inner end to the face of the coal, a continuous cutter chain carried by said frame, means for driving said chain, and means for moving said frame and chain through the coal.

38. In a mining machine, the combination of a supporting frame, a movable cutter frame in the form of a continuous loop carried thereby and having a lower frame member adapted to lie in a horizontal plane, and an upper frame member adapted to lie in a plane inclined upwardly from its inner end to the face of the coal, a continuous cutter chain carried by said frame, means for driving said chain, and means for swinging said frame and chain through the coal to make an arc-shaped cut.

39. In a mining machine, the combination of a supporting frame, a cutter frame mounted thereon for vertical movement, cutting means on said frame adapted to form a substantially horizontal lower kerf in one position of the cutter frame, cutting means on said frame to simultaneously form an upper kerf disposed on a plane inclined upwardly from its inner end to the face of the coal, means for moving said cutter frame to a position where the planes of the kerfs are reversed, and means for moving the cutter frame and cutting means through the coal.

40. In a mining machine, the combination of a supporting frame, a cutter frame mounted thereon for vertical and horizontal movement, cutting means on said frame adapted to form a substantially horizontal lower kerf in one position of the cutter frame, cutting means on said frame to simultaneously form an upper kerf disposed on a plane inclined upwardly from its inner end to the face of the coal, means for moving said cutter frame to a position where the planes of the kerf are reversed, and means for swinging said cutter frame and cutting means through the coal to make an arc-shaped cut.

41. In a coal mining machine, a horizontally extending kerf cutter comprising a body portion and a cutter bar projecting therefrom adapted for forming a kerf cut under a pile of loose coal with said cutter bar, an endless conveyer secured to the body portion of said kerf cutter and having a portion projecting in spaced parallelism with said cutter bar whereby when said cutter bar is forming said kerf the projecting portion of said conveyer will be moved through said kerf and will carry away the coal falling thereupon, and means carried by said cutter bar and overhanging the adjacent portion of said conveyer for preventing coal from falling into the space between the same when moved laterally under the pile of loose coal.

42. In a coal mining machine, a horizontally extending kerf cutter comprising a body portion and a cutter bar projecting therefrom adapted for forming a kerf cut under a pile of loose coal with said cutter bar, an endless conveyor secured to the body portion of said kerf cutter and having a portion projecting in spaced parallelism with said cutter bar whereby when the latter is forming said kerf the projecting portion of said conveyer will be moved through said kerf and will carry away the coal falling thereupon, and a transfer board carried by said cutter bar and overhanging the adjacent portion of said conveyer for preventing coal from falling into the space between the same.

43. In a coal mining machine, a horizontal extending kerf cutter comprising a body portion and a cutter bar projecting therefrom adapted for forming a kerf cut under a pile of loose coal with said cutter bar, an endless conveyer secured to the body portion of said kerf cutter and having a portion projecting in spaced parallelism with said cutter bar whereby when the latter is forming said kerf the projecting portion of said conveyer will be moved through said kerf and will carry away the coal falling thereupon, and an imperforate transfer board extending longitudinally of said cutter bar and removably secured to the top face thereof for bridging the space between the cutter bar and the adjacent portion of said conveyer.

44. In a coal mining machine, a horizontally extending kerf cutter comprising a body portion and a cutter bar projecting therefrom adapted for forming a kerf cut under a pile of loose coal, an endless conveyer, a detachable pan for connecting the intermediate portion of said conveyer to the body portion of said kerf cutter, and means for detachably connecting the front end portion of said conveyer to the cutter bar whereby when the latter is forming said kerf the front end portion of the conveyer will be moved through said kerf and will carry away the coal falling thereupon.

45. In a coal mining machine, a cutter bar, a conveyer fastened thereto and arranged in spaced parallelism therewith, means for moving said members longitudinally and laterally over the floor of a mine, and a transfer board mounted upon the cutter bar and extending laterally to terminate above the conveyer.

46. In a machine of the class described, a cutter frame and a conveyor frame extending horizontally side by side and in spaced relation to each other, a cutter chain on said cutter frame with its active section running along the edge of said cutter frame remote from said conveyor frame, a draft device on said conveyor frame, an apron between said frames and terminating above said conveyor frame, and means to laterally advance said frames together with said conveyor frame in trailing relation to said cutter frame to engage said chain in a mass of material to form a passage therein, said apron acting to transfer material coming thereupon into the path of said draft device.

47. In a machine of the class described, a cutter frame and a conveyor frame extending horizontally side by side and in spaced relation to each other, a cutter chain on said cutter frame with its active section running along the edge of said cutter frame remote from said conveyor frame, a draft device on said conveyor frame, an apron secured to the upper edge of said conveyor frame adjacent said cutter frame and extending toward the latter, and means to laterally advance said frames together with the conveyeor frame in trailing relation to the cutter frame to engage said chain in a mass of material to form a passage therein, said apron acting to transfer material coming thereupon into the path of said draft device.

48. A machine according to claim 46 wherein the said frames are connected to a common supporting frame.

49. A machine according to claim 46 wherein the said frames are connected to a common supporting frame, and motive means on said supporting frame to feed all the frames adjacent the mass of material to be operated on.

In testimony whereof I have hereunto set my hand.

NILS D. LEVIN.